United States Patent [19]

Yanagisawa

[11] 4,385,316
[45] May 24, 1983

[54] IMAGE PROJECTION SYSTEM
[75] Inventor: Yuzuru Yanagisawa, Fujisawa, Japan
[73] Assignee: Sony Corporation, Tokyo, Japan
[21] Appl. No.: 217,418
[22] Filed: Dec. 17, 1980
[30] Foreign Application Priority Data
  Dec. 27, 1979 [JP] Japan ................................. 54-173036
[51] Int. Cl.³ ............................................. H04N 9/54
[52] U.S. Cl. ..................................... 358/89; 358/237
[58] Field of Search ............................ 358/237, 88, 89
[56] References Cited
  U.S. PATENT DOCUMENTS
  3,023,408  2/1962  Adams ................................... 358/89
  3,036,154  5/1962  Harman .............................. 358/238
  3,041,496  7/1962  Creamer, Jr. et al. .............. 358/238

OTHER PUBLICATIONS

Y. Yanagisawa, A New Three-Dimensional Television Receiver, 6/80, pp. 120-125.

Primary Examiner—John C. Martin
Assistant Examiner—Edward L. Coles
Attorney, Agent, or Firm—Lewis H. Eslinger; Alvin Sinderbrand

[57] ABSTRACT

An image projection system includes a cathode ray tube for generating light corresponding to an image; a projecting lens disposed in front of the cathode ray tube for focusing and projecting the light from the cathode ray tube, and having an optical axis; a beam splitter disposed in front of the projecting lens, the beam splitter being inclined with respect to the optical axis of the projecting lens for reflecting the light from the cathode ray tube in a first direction perpendicular to the optical axis of the projecting lens; and a reflecting mirror disposed adjacent the beam splitter for reflecting the light reflected from the beam splitter in a second direction which is opposite to the first direction so as to project the light from the cathode ray tube to a viewer through the beam splitter.

10 Claims, 7 Drawing Figures

IMAGE PROJECTION SYSTEM

BACKGROUND OF THE INVENTION

1. Field of the Invention

This invention relates to an image projection system and, more particularly, is directed to an image projection system in which a picture produced by a television receiver is enlarged and projected for a viewer.

2. Description of the Prior Art

Figure 1:
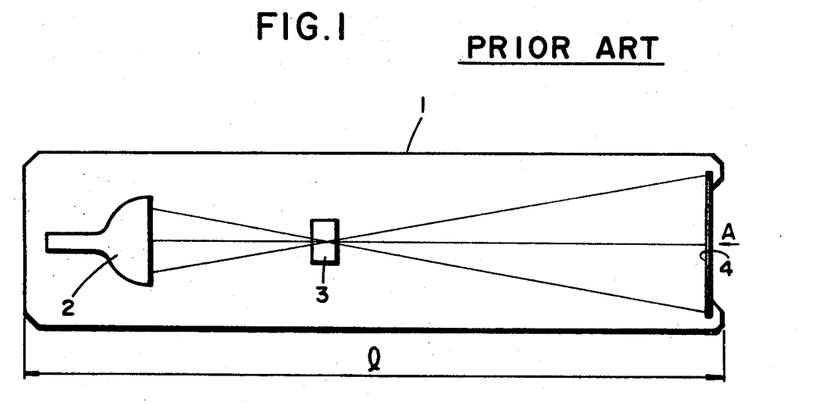
FIG. 1 is a schematic plan view of a conventional rear projector.

A conventional projector, shown in FIG. 1 and which is known as a rear projector includes a television receiver 2, a lens 3 for focusing light from the picture produced by television receiver 2, and a screen 4 onto which the picture produced by the television receiver is projected, all of the elements being arranged in series with each other in a casing 1. A viewer sees the projected picture in the direction shown by arrow A in FIG. 1. As should be clear from FIG. 1, the distance between television receiver 2 and screen 4 is considerably large, for example, the horizontal length l of the projector of FIG. 1 is about 165 cm.

Figure 2:
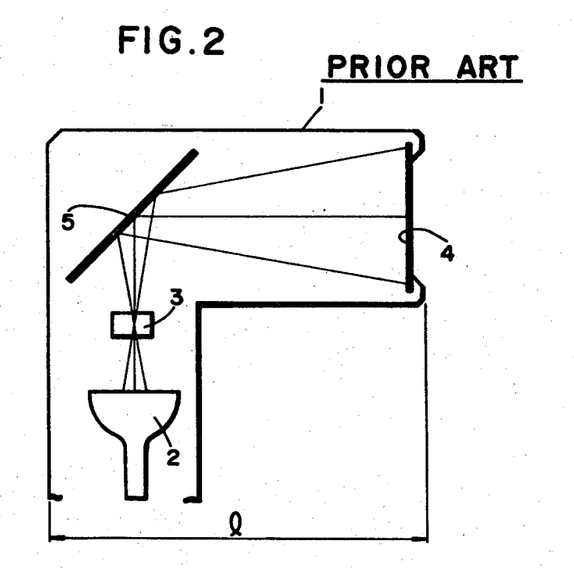
FIG. 2 is a schematic plan view of another conventional rear projector.

Another conventional rear projector is shown in FIG. 2 to include a reflecting mirror 5, in addition to the television receiver 2, lens 3 and screen 4 in casing 1. The light from television receiver 2 is focused by lens 3, and then reflected by reflecting mirror 5 so as to be projected onto screen 4. When the magnification of the picture is the same as the projector of FIG. 1, for example, the horizontal length l of the projector of FIG. 2 is about 90 cm which is smaller than that of the projector of FIG. 1.

However, in the projector of FIG. 1, television receiver 2, lens 3 and screen 4 are arranged in series with each other, and in the projector of FIG. 2, the picture produced by television receiver 2 is reflected by reflecting mirror 5 so as to be projected onto screen 4, by the use of a certain optical law. However, the size of such projectors can not be made sufficiently small, for optical reasons.

OBJECTS AND SUMMARY OF THE INVENTION

Accordingly, it is an object of this invention to provide an image projection system which is of a small-size and is compact in construction.

Another object of this invention is to provide a novel image projection system in which the picture is three-dimensionally displayed.

In accordance with an aspect of the invention, an image projection system includes image source means for generating light corresponding to an image; projecting lens means disposed in front of the image source means for projecting the light, and having an optical axis; beam splitting means disposed in front of the projecting lens means and inclined with respect to the optical axis of the projecting lens means for reflecting at least a portion of the light projected from the image source means in a first direction; and reflecting means disposed in the vicinity of the beam splitting means for reflecting the light reflected from the beam splitting means in a second direction which is opposite to the first direction to a viewer through the beam splitting means.

In accordance with another aspect of this invention, a three-dimensional projection system includes first image source means for generating light corresponding to an image; first projecting lens means disposed in front of the first image source means for projecting the light from the first image source means; second image source means disposed opposite to the first image source means for generating light corresponding to an image; second projecting lens means disposed in front of the second image source means for projecting the light from the second image source means; beam splitting means disposed between the first image source means and the second image source means, the beam splitting means being inclined with respect to the first and second image source means for reflecting the light from the first image source means in a first direction, and for reflecting the light from the second image source means in a second direction which is opposite to the first direction; and reflecting means disposed in the vicinity of the beam splitting means for reflecting the light reflected by the beam splitting means from the second image source means in the first direction, wherein light from the first image source means is reflected by the beam splitting means to a viewer and light from the second image source means is reflected by the beam splitting means and the reflecting means to the viewer through the beam splitting means.

The above, and other, objects, advantages and features of the present invention will become readily apparent from the ensuing detailed description of illustrative embodiments of the invention which is to be read in connection with the accompanying drawings.

DETAILED DESCRIPTION OF THE PREFERRED EMBODIMENTS

Figure 3:
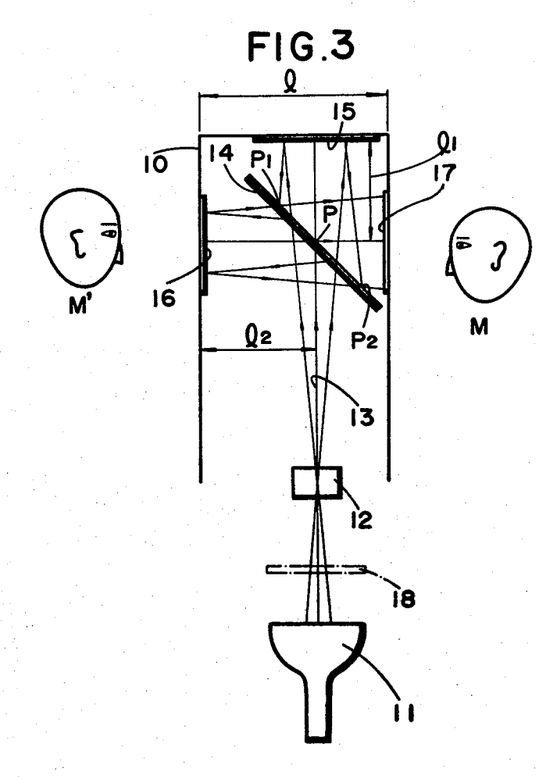
FIG. 3 is a schematic side plan view of an image projection system according to a first embodiment of this invention.

Referring to the drawings in detail, and initially to FIG. 3 thereof, there is shown an image projection system according to a first embodiment of this invention.

A television receiver 11, such as a CRT (Cathode Ray Tube), as an image source, is positioned in an upwardly facing arrangement in the lower part of a vertical casing 10. A lens 12 is arranged above television receiver 11 in casing 10 and a beam splitter 14, for example, a half mirror, is further arranged above lens 12 and is inclined at an angle of 45°. The center P of beam splitter 14 lies on the extension of the central or optical axis 13 of lens 12 and television receiver 11. Further, a reflecting mirror 15 is arranged above beam splitter 14 and the normal axis of reflecting mirror 15 is aligned with the extension of optical axis 13 of lens 12 and television receiver 11. Thus, the light passing through beam splitter 14 is reflected by reflecting mirror 15. Another reflecting mirror 16 is arranged at the left side of beam splitter 14 and the normal axis of reflecting mirror 16 is perpendicular to the optical axis 13 of lens 12 and television receiver 11. The distance $l_1$ between the central point P of beam splitter 14 and reflecting mirror 15 is equal to the distance $l_2$ between the central point P or beam splitter 14 and reflecting mirror 16. A screen 17 is arranged at the right side of beam splitter 14 and is engaged with an opening of casing 10 whereby a viewer M sees the picture projected onto screen 17.

In operation, light from the picture of television receiver 11 is focused by lens 12 and is projected onto beam splitter 14. A part of the light projected onto beam splitter 14 passes through beam splitter 14, while another part is reflected by beam splitter 14 onto reflecting mirror 16. The light passing through beam splitter 14 is reflected back to beam splitter 14 by reflecting mirror 15 and the light reflected by reflecting mirror 16 is also reflected back to beam splitter 14. The light reflected by reflecting mirror 16 and the light reflected by reflecting mirror 15 coincide with each other at a zone extending from a point $P_1$ to another point $P_2$ on beam splitter 14. The picture from television receiver 11 is thus enlarged and reflected onto screen 17 by beam splitter 14. The viewer M sees the enlarged picture on screen 17 in the direction normal to optical axis 13 of lens 12 and television receiver 11.

As described above, light travels back and forth between beam splitter 14 and reflecting mirror 15, and between beam splitter 14 and reflecting mirror 16. Thus, the horizontal length 1 of the image projection system can be reduced to the sum of the length $l_2$ and another length from the central point P of beam splitter 14 required for mounting television receiver 11, lens 12 and beam splitter 14, to screen 17. For example, the horizontal length 1 of the image projection system of FIG. 3 is about 40 cm for the same projecting magnification as the conventional image projection system of FIG. 1.

The reflecting mirror 15 is not always necessitated in the image projecting system of FIG. 3. However, the brightness of the enlarged picture on screen 17 can be increased with reflecting mirror 15, and the height of the image projection system is not increased very much by providing reflecting mirror 15.

It is known that some part of the light reflected by beam splitter 14 returns to lens 12 and television receiver 11, as unwanted light. Accordingly, filter, such as a polarizing plate 18, shown by a dot-dash line in FIG. 3, or a light lattice member (Venetian Blind), may be arranged in front of television receiver 11 so as to decrease the unwanted light reflected back to television receiver 11. Further, if reflecting mirror 16 is also a beam splitter, a viewer M' can also see the enlarged picture therethrough.

Figure 4:
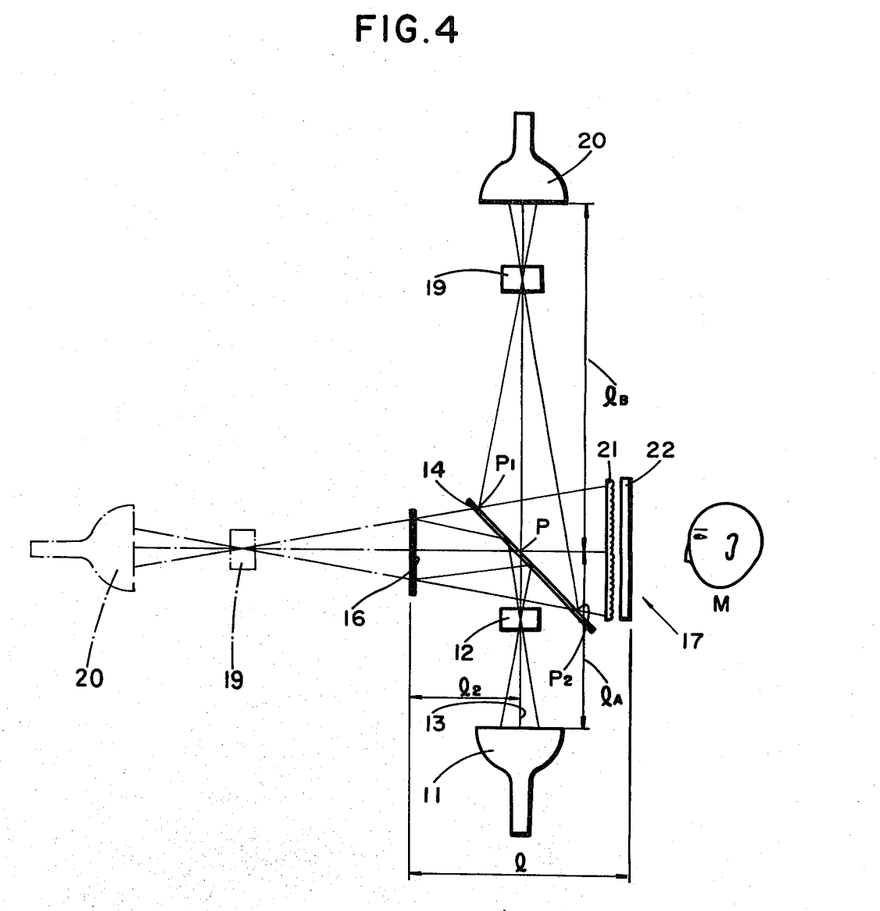
FIG. 4 is a schematic side plan view of an image projection system according to a second embodiment of this invention.

Referring now to FIG. 4, it will be seen that, in an image projection system according to a second embodiment of this invention, elements corresponding to those described above with reference to the system of FIG. 3 are identified by the same reference numerals.

In the system of FIG. 4, another lens 19 and another television receiver 20 are arranged directly above beam splitter 14 in a downwardly facing relation as shown by the solid lines in FIG. 4, and reflecting mirror 15 is eliminated. The optical axis of lens 19 and television receiver 20 coincide with the optical axis 13 of lens 12 and television receiver 11, and lens 19 and television receiver 20 are disposed opposite or in opposing relation to lens 12 and television receiver 11. The distance $l_A$ between the central point P of beam splitter 14 and television receiver 11 is chosen smaller than the distance $l_B$ between the central point P of beam splitter 14 and television receiver 20 ($l_A < l_B$).

A lenticular lens 21 and a Fresnel lens 22 are arranged so as to form screen 17. Lens 21 may be of the vertical convex type or of the horizontal convex type.

In operation, light from the picture of lower television receiver 11 is focussed by lens 12 and is projected onto the lower surface of beam splitter 14, while light from the picture of upper television receiver 20 is focussed by lens 19 and is projected onto the upper surface of beam splitter 14. A part of the light projected onto the lower surface of beam splitter 14 from the picture of television receiver 11 is reflected onto reflecting mirror 16 by beam splitter 14 and then is reflected back to beam splitter 14 by reflecting mirror 16. As the result, the enlarged pictures from television receivers 11 and 20 coincide with each other at a zone extending from a point $P_1$ to another point $P_2$ on beam splitter 14 and are projected onto lenticular lens 21. The viewer M sees the enlarged picture through lenticular lens 21 and Fresnel lens 22, both of which function as the screen 17. The resultant enlarged picture is thus the same as an enlarged pictured which is obtained by a series projection system shown by the dot-dash line in FIG. 4. The horizontal length 1 of the image projection system of FIG. 4 is equal to the sum of the lengh $l_2$ between the central point P of beam splitter 14 and reflecting mirror 16, and a length from the central point P of beam splitter 14 required for mounting television receivers 11 and 20 and lenses 12 and 19, to screen 17. The horizontal length 1 of the image projection system of FIG. 4 is therefore smaller than that of the system shown by the dot-dash line in FIG. 4.

In the embodiment of FIG. 4, the pictures from television receivers 11 and 20 coincide with each other on beam splitter 14 and viewer M sees the two-dimensional coincident enlarged picture. However, a parallax stereograph or three dimensional picture can be obtained by using the projection system of FIG. 4. In such case, television receiver 20 is inclined with respect to television receiver 11 so that light from the picture of television receiver 20 is deflected on beam splitter 14 by an angle of parallax with respect to light from the picture of television receiver 11. The parallax stereograph or picture is then projected onto lenticular lens 21 to be observed by viewer M. Thus, television pictures are displayed in three dimension. The television receivers 11 and 20 which are inclined with respect to each other may be arranged side by side so as to obtain the parallax stereograph.

Figure 5:
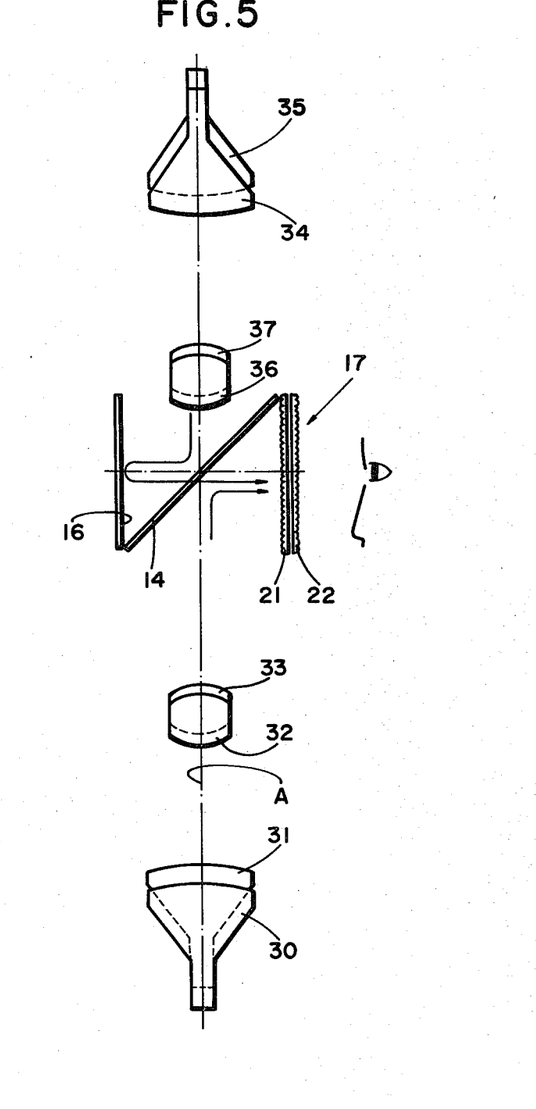
FIG. 5 is a schematic side plan view of a three-dimensional image projection system according to a third embodiment of this invention.
Figure 6:
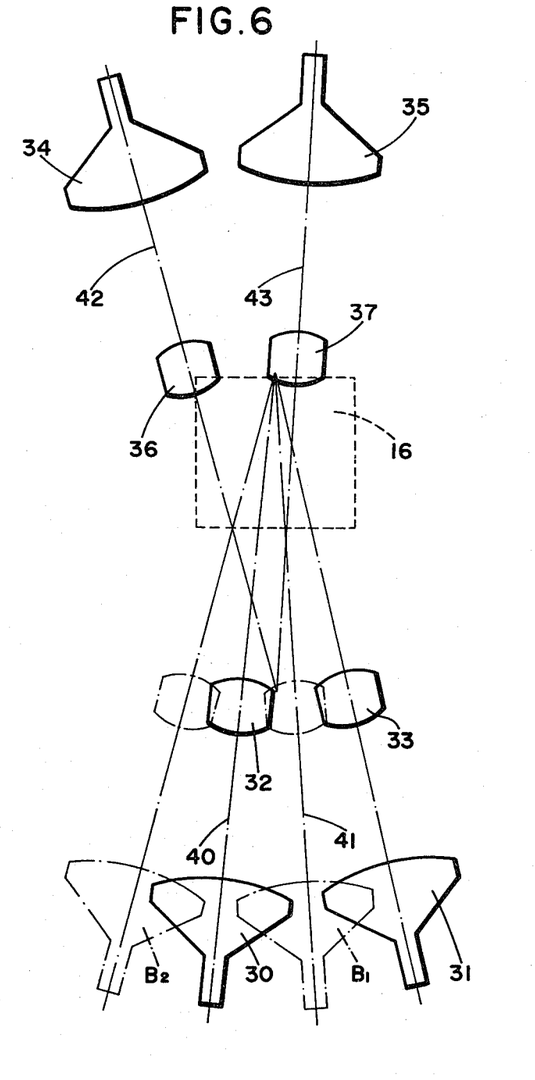
FIG. 6 is a schematic front plan view of the three-dimensional image projection system of FIG. 5.
Figure 7:
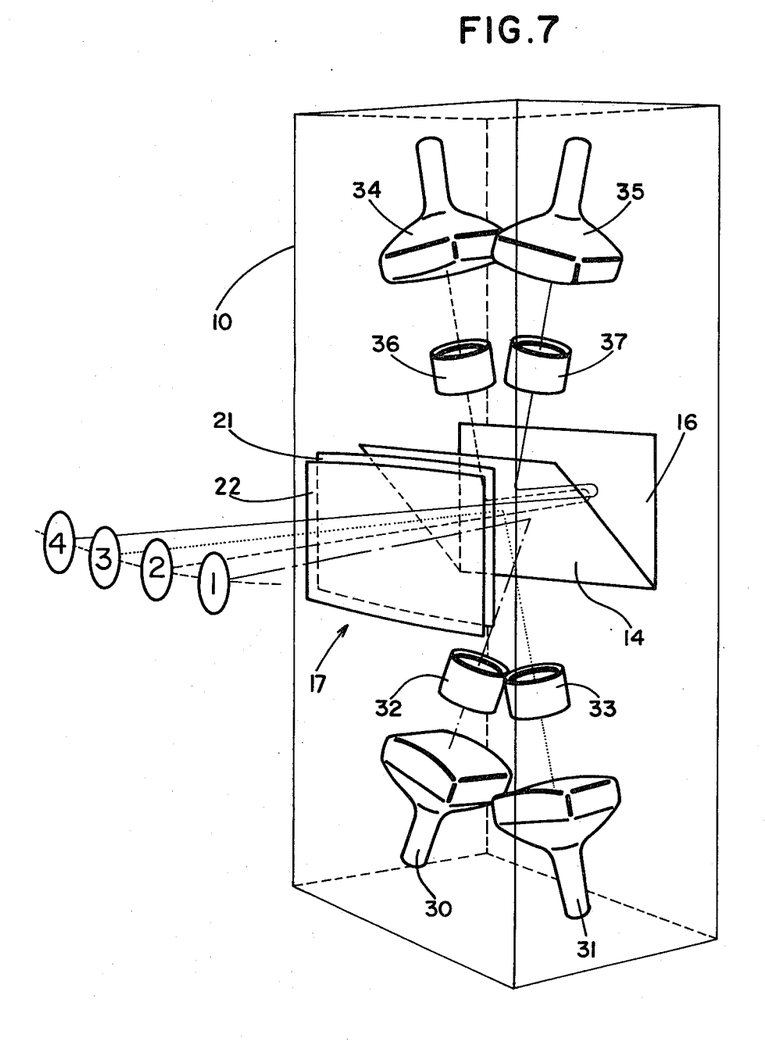
FIG. 7 is a schematic perspective view of the three-dimensional image projection system of FIG. 5.

Referring niow to FIGS. 5-7, a three-dimensional projection system according to a third embodiment of this invention will be described, in which elements corresponding to those described above with reference to the systems of FIGS. 3 and 4 are identified by the same numerals.

As shown therein, a pair of television receivers 30 and 31 are both arranged in an upwardly facing relation under beam splitter 14 in the vertical casing 10 in FIG. 5 and FIG. 6. A pair of lenses 32 and 33 are arranged between the splitter 14 and the pair of the television receivers 30 and 31, respectively. Another pair of television receivers 34 and 35 are arranged in a downwardly facing relation above beam splitter 14 and a pair of lenses 36 and 37 are arranged between beam splitter 14 and the other pair of television receivers 34 and 35, respectively. Lensesn 32, 33, 36 and 37 are arranged in a circle along an axial plane A shown in side view on FIG. 5 and shown in plan view on FIG. 6. Optical axes 40 and 41 of lenses 32 and 33 and of television receivers 30 and 31, respectively, intersect with each other, while optical axes 42 and 43 of lenses 36 and 37 and of television receivers 34 and 35, respectively, intersect with each other. The pair of television receivers 30 and 31 are arranged opposite to the other pair of television receivers 34 and 35 but the intersecting points of optical axes 40 and 41, and optical axes 42 and 43, are not coincident with each other. The dot-dash lines in FIG. 6 indicate the impossible overlapping positions at the bottom of the figure that television receivers 30 and 31 (at $B_1$ and $B_2$), and lenses 32 and 33 would have to assume if the four television receivers are installed in line. The lenticular lens 21 of the horizontal convex type and Fresnel lens 22 comprise screen 17 and are arranged near beam splitter 14.

In operation, the pictures of television receivers 30 and 31 are projected onto the lower surface of beam splitter 14 along optical axes 40 and 41, respectively, while the pictures of television receivers 34 and 35 are projected onto the upper surface of beam splitter 14 along optical axes 42 and 43, respectively. The pictures from television receivers 30 and 31 are reflected onto lenticular lens 21 as a focus surface by beam splitter 14. The pictures from television receivers 34 and 35 are reflected onto reflecting mirror 16 by beam splitter 14 and then reflected back to lenticular lens 21 by reflecting mirror 16. The four pictures from television receivers 30, 31, 34 and 35 are projected substantially at the same zone on lenticular lens 21.

Thus, the images projected by television receivers 34 and 35 are reflected back to reflecting (surface) mirror 16 and then out to the viewing zones shown by ①②③④ in FIG. 7 while the images projected by television receivers 30 and 31 are reflected directly to such viewing zones. The lenticular lens 21 focuses the images and Fresnel lens 22 enlarges the image for easy viewing. The two images from the upper television receivers 34 and 35 and the two images from the lower television receivers 30 and 31 are presented to the viewer in a single line, slightly overlapping, which the viewer perceives as a single stereo picture. The television receivers 30, 31, 34 and 35 project four viewing zones separated, for example, by 6.2 cm, which is the average distance between the human eyes. From these four viewing zones, three stereograms are derived which are presented with no separation.

If upper television receivers 34 and 35 are placed at positions $B_1$ and $B_2$ shown by dot-dash lines in FIG. 6, the same stereograms are presented to the viewer. However, as described above, such arrangement is impossible. In the manner shown in FIGS. 5 to 7, television receivers 30, 31, 34 and 35 can be freely arranged without increasing the system size very much.

In FIG. 7, viewing zones 1 2 3 and 4 correspond to television receivers 30, 34, 31 and 35 respectively. In the arrangement of FIGS. 5 to 7, three pairs of stereograms are derived from the four images available so that if the viewer moves his head to the right or left he will not perceive a pseudoscopic image. The first stereogram is obtained by television receivers 30 and 34, the second stereogram by television receivers 31 and 34, and the third stereogram by television receivers 31 and 35.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An image projection system comprising:
   first image source means for generating light corresponding to an image;
   first projecting means disposed in front of said image source means for projecting said light, and having an optical axis;
   beam splitting means disposed in front of said projecting lens means and inclined with respect to the optical axis of said projecting lens means for reflecting at least a portion of the light projected from said image source means in a first direction;
   reflecting means disposed in the vicinity of said beam splitting means for reflecting the light reflected from said beam splitting means in a second direction which is opposite to said first direction to a viewer through said beam means;
   second image source means disposed opposite to said first image source means for generating light corresponding to an image; and
   second projecting lens means disposed in front of said second image source means for projecting the light from said second image source means onto said beam splitting means, which light is then reflected by said beam splitting means and projected to a viewer.

2. An image projection system according to claim 1, wherein said second projecting lens means has an optical axis which is parallel with the optical axis of said first projecting lens means, said reflecting means has a normal axis which is perpendicular to the optical axis of said first and second projecting lens means, and said beam splitting means includes a half-mirror which is inclined at an angle of 45° with respect to the optical axis of both said projecting lens means so as to reflect a portion of the light impinging thereon and to pass therethrough a portion of the light impinging thereon.

3. An image projection system comprising:
   image source means for generating light corresponding to an image;
   projecting lens means disposed in front of said image source means for projecting said light, and having an optical axis;
   beam splitting means disposed in front of said projecting lens means and inclined with respect to the optical axis of said projecting lens means for reflecting at least a portion of the light projected from said image source means in a first direction;
   reflecting means disposed in the vicinity of said beam splitting means for reflecting the light reflected from said beam splitting means in a second direction which is opposite to said first direction to a viewer through said beam splitting means; and
   screen means disposed in the vicinity of said beam splitting means for displaying the light reflected by said reflecting means, said screen means being comprised of at least one of a lenticular and a Fresnel lens.

4. An image projection system comprising:

image source means for generating light corresponding to an image;

projecting lens means disposed in front of said image source means for projecting said light, and having an optical axis;

beam splitting means disposed in front of said projecting lens means and inclined with respect to the optical axis of said projecting lens means for reflecting at least a portion of the light projected from said image source means in a first direction;

reflecting means disposed in the vicinity of said beam splitting means for reflecting the light reflected from said beam splitting means in a second direction which is opposite to said first direction to a viewer through said beam splitting means; and second reflecting means disposed in the vicinity of said beam splitting means and opposite to said image source means.

5. An image projection system according to claim 4, wherein said second reflecting means has a normal axis which is parallel to the optical axis of said projecting lens means, said first-mentioned reflecting means has a normal axis which is perpendicular to the optical axis of said projecting lens means, and said beam splitting means includes a half-mirror which is inclined at an angle of 45° with respect to the optical axis of said projecting lens means so as to reflect a portion of the light impinging thereon and to pass therethrough a portion of the light impinging thereon.

6. An image projection system according to claim 4, further comprising filter means disposed in front of said image source means for reducing light reflected back to said image source means.

7. A three-dimensional image projection system comprising:

first image source means for generating light corresponding to an image;

first projecting lens means disposed in front of said first image source means for projecting said light from said first image source means;

second image source means disposed opposite to said first image source means for generating light corresponding to an image;

second projecting lens means disposed in front of said second image source means for projecting said light from said second image source means;

beam splitting means disposed between said first image source means and said second image source means, said beam splitting means being inclined with respect to said first and second image source means for reflecting the light from said first image source means in a first direction, and for reflecting the light from said second image source means in a second direction which is opposite to said first direction; and reflecting means disposed in the vicinity of said beam splitting means for reflecting the light reflected by said beam splitting means from said second image source means in said first direction, wherein light from said first image source means is reflected by said beam splitting means to a viewer and light from said second image source means is reflected by said beam splitting means and said reflecting means to the viewer through said beam splitting means.

8. A three-dimensional image projection system according to claim 7, further comprising at least one of a lenticular lens and a Fresnel lens disposed between said beam splitting means and the viewer.

9. A three-dimensional image projection system according to claim 7, wherein each of said first and second image source means includes a plurality of cathode ray tubes.

10. A three-dimensional image projection system according to claim 7, wherein said beam splitting means includes a half-mirror.

* * * * *